// Patent: United States Patent — Kamphues
// [11] 3,887,060
// [45] June 3, 1975

[54] APPARATUS AND METHODS FOR FORMING ROWS OF SELECTIVELY SPACED ARTICLES

[75] Inventor: Hermann Kamphues, Laggenbeck, Germany

[73] Assignee: C. Keller u. Co., Laggenbeck, Germany

[22] Filed: Mar. 7, 1974

[21] Appl. No.: 448,830

[30] Foreign Application Priority Data
Mar. 15, 1973  Germany.............................. 2312946

[52] U.S. Cl. ..................... 198/30; 198/24; 198/34; 214/6 A
[51] Int. Cl. ............................................ B65g 47/32
[58] Field of Search .......... 198/29, 30, 34, 24, 31 R, 198/235, 31 AB; 214/6 DK, 6 M, 6 A

[56] References Cited
UNITED STATES PATENTS

| | | |
|---|---|---|
| 2,686,603 | 8/1954 | Lawson............................ 198/34 X |
| 3,338,431 | 8/1967 | Thedick ........................... 214/6 DK |
| 3,621,973 | 11/1971 | Carlson et al........................ 198/29 |
| 3,622,023 | 11/1971 | Keck................................ 198/34 X |
| 3,703,965 | 11/1972 | Coats ................................ 214/6 DK |

Primary Examiner—Evon C. Blunk
Assistant Examiner—Richard K. Thomson

[57] ABSTRACT

Articles closely spaced to one another are assembled in a row on a fixed support and lifted onto a carrier that is movable forwardly longitudinally of the row. A movable stop lies in the path of movement of the row of articles. Stopping the movement of the stop while continuing movement of the carrier interrupts movement of the articles and causes one or more articles at the rear end of the row to be discharged from the carrier. Continued conjoint movement of the carrier and the stop in the same direction establishes a space between the foremost discharged article and the rearmost article on the carrier, whereupon stopping the movement of the stop enables such rearmost article to be discharged from the carrier at a selected distance from the previously discharged article.

15 Claims, 5 Drawing Figures

APPARATUS AND METHODS FOR FORMING ROWS OF SELECTIVELY SPACED ARTICLES

This invention relates to methods and apparatus for forming a longitudinal row of articles which singly or in groups are spaced at predetermined intervals in the row and wherein the spacing is produced by separating articles or groups of articles, starting from an initial longitudinal row with the articles disposed closely together.

For the further treatment of various articles it is important to form longitudinal rows wherein the individual articles or groups of such articles are at specific spacings from each other. The resulting longitudinal rows can then for instance be laid on a pallet or the like according to a specific system.

The formation of this type of longitudinal row with precisely determined spacing between individual articles or groups of articles is of particular importance for ceramic briquettes (e.g. tiles), which are possibly already dried and are to be fired in a furnace: in this case the individual briquettes should be fired as uniformly as possible from various sides. The longitudinal rows formed are disposed adjacent each other, e.g. on a firing trolley, in a mounting or stacking layer, whereafter a number of such stacking layers are superimposed.

In a known method for forming a longitudinal row of articles, the individual articles are delivered from a conveyor belt and pushed close together to form an initial longitudinal row. The foremost article of this row is then received by a second longitudinally adjacent conveyor belt which rotates with greater speed than the first conveyor belt and is disposed in a frame tiltable about an axis, whereby in the uptilted position the rearmost frame edge, formed as a stop, the second conveyor belt stops the delivered longitudinal row, while the foremost article received on the second conveyor belt is advanced at least a certain distance on that conveyor belt. In similar manner the two foremost articles can if necessary also be received by the second conveyor belt and advanced. The articles or groups of articles separated in this manner then reach a third conveyor belt which is fitted with cross-bars equally spaced from each other and which thus determine the intervals between the individual articles or groups of articles. The longitudinal row thus formed with intervals between the articles can then be discharged from the third conveyor belt onto a depositing bench and disposed adjacent each other in stacking layers in such manner that the separated articles or groups of articles in the longitudinal rows form transverse rows aligned with each other, with predetermined intervals.

In this known method, which is mainly used for forming stacking layers of ceramic briquettes, it has been found especially disadvantageous that because of the construction of the device used for performing the method, longitudinal rows or stacking layers can only be formed from articles (ceramic briquettes) which have substantially the same shape and dimensions. When used for articles with different dimensions, time-consuming and expensive conversion work is needed with this known device. Also since the initial longitudinal row formed by the first conveyor belt is intermittently advanced and has constantly to be held against the effect of this first belt, firstly undesirable forces are applied to the corresponding parts of the device and secondly the articles can very easily be damaged, especially in the case of ceramic briquettes. When the resulting longitudinal rows are then to be put adjacent each other in a stacking layer to ensure exact alignment of the articles in transverse rows (at appropriate intervals) additional elements must be provided, e.g. guide strips or the like corresponding to the spacings, and these are a further expense.

The invention is thus based on the avoidance of these defects of the known method by the provision of a method wherein with relatively careful treatment of the articles and relatively simple construction of the device needed for carrying out the method, a longitudinal series of articles with any desired spacing between individual articles or groups of articles can be formed, and wherein no mechanical conversion of such device is needed when the articles are changed in shape and size.

This object of the invention is achieved by a method in which a selected number of articles assembled in a row on a fixed support is first lifted from the fixed support by means of a carrier and is moved by such carrier towards the front end of the row until the foremost article comes into contact with an adjustable stop so that, on further movement of the carrier, at least the rearmost article of the lifted group of articles is again deposited on the fixed support, whereafter the stop is moved into a new position which determines the next spacing.

In the method provided by the invention a specific portion of the initial longitudinal row (and this may in fact be the entire initial row) is engaged from below by the carrier and is moved in the direction of the front end of the row towards the adjustable stop, so that one article or a group of articles are thus deposited again on the fixed support. In this way a longitudinal row of any size can be segregated relatively quickly in the desired manner, with the interval between two successive articles or groups of articles determined in very simple manner by the position chosen for the stop, so that the intervals in a particular row can be uniform or of different sizes absolutely as desired and according to requirements. Since the articles are lifted only slightly from the fixed support by the carrier, they can be separated in extremely gentle manner, and this is of advantage especially with fragile articles such as pre-dried ceramic briquettes.

A further advantage of the method provided by the invention lies in the fact that the spacing of articles or groups of articles can be effected completely independently of the particular shape and size of the articles. In particular this makes unnecessary any mechanical conversion of the device suitable for carrying out the method of the invention, and helps to ensure that such device is of relatively simple construction.

In order that a number of longitudinal rows of articles may also be disposed adjacent each other with mutually aligned articles in a stacking layer, in which the separate articles or groups of articles in the longitudinal rows form transverse rows at the predetermined spacings, it is desirable if a chosen portion of all the initial longitudinal layers belonging to a stacking layer are lifted simultaneously from the fixed support with the aid of the carrying element and during their movement by the carrying element are again deposited on the fixed support while forming transverse rows of separate or grouped articles. In this way the articles of all the initial longitudinal rows belonging to a stacking layer can thus be separated in the desired manner (separately or in groups) in a single operation, while at the same time all the articles belonging to a transverse row (in the stacking layer) can be correctly aligned. In contrast to the known method described above, this can be achieved with an appreciable saving of labor and time, together with considerably reduced plant costs.

The method in accordance with the invention is also notable for needing very short periods to form and prepare the individual stacking layers, since the articles assembled in a stacking layer only have to be conveyed over extremely short distances. Stacking layers can thus be formed automatically with a high output and are then superimposed in usual manner into the corresponding stacks. In accordance with the invention the individual stacking layers can have any desired rectangular form (including a square) according to requirements.

In view of the features referred to earlier, the method in accordance with the invention can be of particular benefit in the forming and preparation of stacks of ceramic briquettes which have had a preliminary drying and are to be finally fired in a furnace. An effective formation of the stack of briquettes (with appropriate spacings in the transverse rows at least) is a main condition for uniform firing of the ceramic briquettes.

A device for carrying out the methods provided by the invention can comprise a conveyor member for feeding closely adjacent articles in a longitudinal row, a fixed support to receive the supplied longitudinal row, and means for separating articles or groups of articles while maintaining predetermined spacings. In accordance with the invention it is an advantage if the fixed support consists of an easily lowerable roller track disposed near the conveyor member and with feed rollers disposed transversely of the previous feed direction, such rollers being spaced apart and having between them support strips of the carrier element which during the forming of spaces in the longitudinal row can be moved in the direction of the longitudinal axes of the rollers, and is made adjustable by the stop which comes into contact with the foremost article and determines the individual spacings.

The invention will be described in more detail below with relation to a device suitable for performing this method and shown in the drawings. In these:

Figure 1:
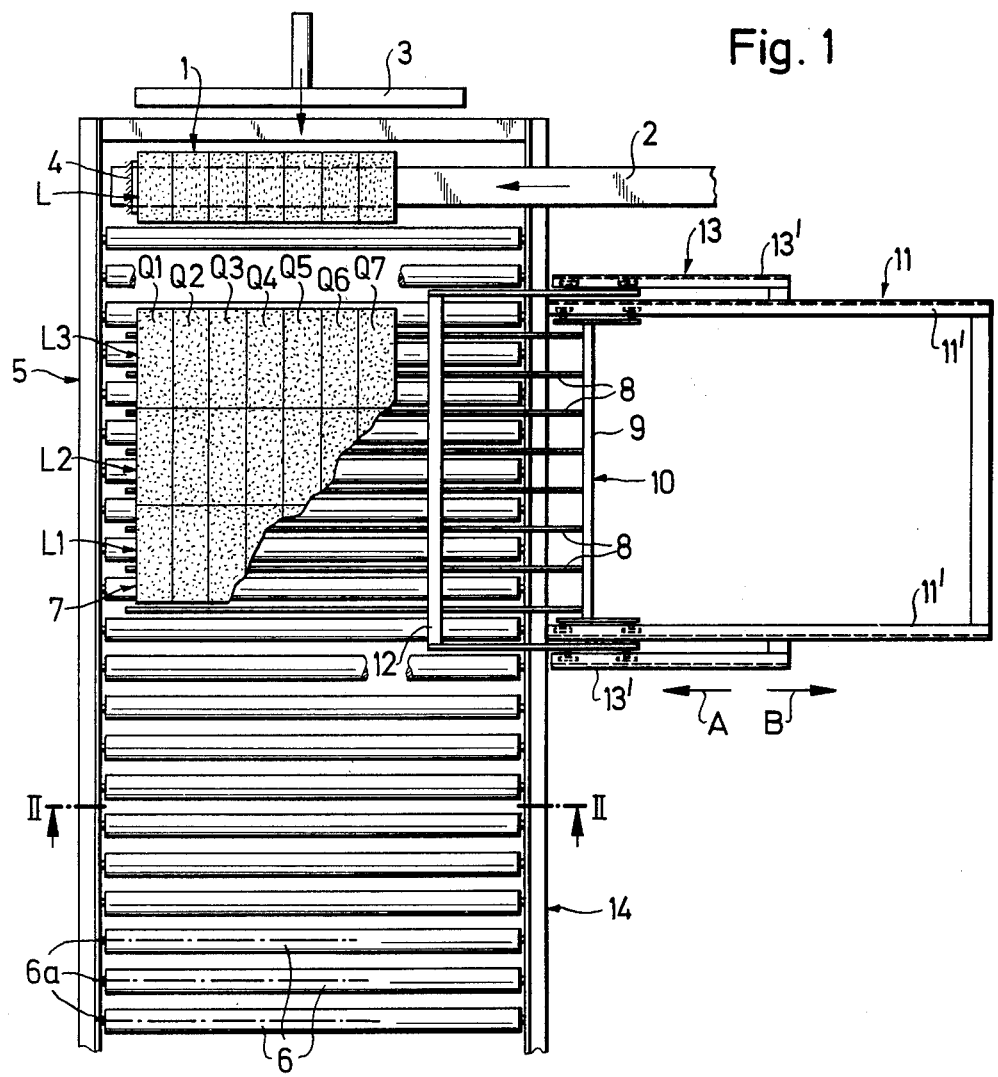
FIG. 1 is a plan view of the entire device during a first stage of the method.
Figure 2:
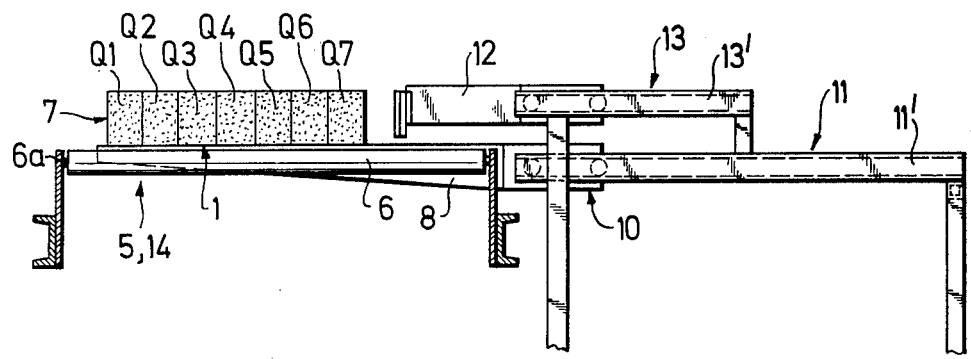
FIG. 2 is a sectional view taken on the line II—II of FIG. 1.

The apparatus in accordance with the invention and shown in the drawings forms longitudinal rows L, for instance of pre-dried ceramic briquettes 1 (e.g. tiles), in a manner to be described below, and these rows are then disposed adjacent each other in a square or rectangular stacking layer.

The closely adjacent briquettes 1 are delivered on a conveyor belt 2 in the required numbers. At one longitudinal side of the conveyor belt 2 is a pusher member 3 movable generally at right angles to the direction of feed of the conveyor belt and which pushes the initial longitudinal row of briquettes 1, held in place by a stop element 4, transversely to their previous direction of travel from conveyor belt 2 on to a fixed support or setting table 5 which in general is located on the other longitudinal side of the conveyor belt 2 and consists of a roller track with driven rollers 6 feeding transversely to the previous feed direction. On the setting table 5 as many longitudinal rows L of briquettes may be assembled in closely spaced relation into an initial stacking layer 7 as are needed for the layer concerned; in this case for instance three longitudinal rows L1, L2, L3 of briquettes are assembled on the table 5.

Tine-like strips 8 are provided in the spaces between the individual rollers 6 in the area where the initial stacking layer 7 is disposed. The strips 8 extend from one side of a support bar 9 and, with the latter, form a carrier 10. This carrier 10 can be moved to and fro along a path extending in the longitudinal direction of the rows L1–L3, as indicated by the arrows A and B. The carrier is mounted by means of wheels on a frame 11 containing rails 11' extending generally parallel to the longitudinal axes 6a of the rollers 6.

In order that the briquettes 1 of the initial stacking layer 7 can be lifted from their fixed support, i.e., the setting table 5, with the aid of the support strips 8, this table 5 can be slightly lowered relative to the support strips 8 in a manner well known in the art.

Above the setting table 5 and the support strips 8 is disposed a stop 12 having a bar-like member extending transversely of the path of movement of the carrier 10 and which can also be moved to and fro in the direction of arrows A and B, for which purpose there is provided a wheeled frame 13 which has further rails 13' above and parallel to the rails 11' of the carrier 10. As will be explained in detail below, the stop 12 is used to interrupt movement of the briquettes carried by the carrier 10, and to push at least one transverse row thereof back down onto the setting table 5. For this purpose the stop 12 is moved in the direction of the arrow A to a specific starting position and then stopped. After the required number of briquettes (e.g. one or more transverse rows of the initial setting layer 7) have been lifted from the table 5, the stop 12 may be moved (in the drection of arrow B) into a new position, the amount of movement being determined by the distance between the last transverse row of briquettes transferred and the next row to be transferred.

The apparatus is disclosed as being manually operated, but it will be understood that automatic controls can be used to effect movement of the parts of the apparatus, whereby the size and number of spaces required between the briquettes in a full longitudinal row or between the transverse rows in a full initial stacking layer 7 can be pre-selected.

By means of a drive, not shown, the carrier 10 is moved uniformly in the direction of arrow B during the separation or during the formation of the required intervals between the briquettes 1 in the longitudinal rows. The stop 12 is preferably moved in synchronism with the strip table 10 while it is moving from one transfer position to the next.

The individual longitudinal starting rows with their closely adjacent briquettes 1 are transferred by the pusher member 3 from the conveyor belt 2 onto the fixed support or setting table 5. Here an initial stacking layer 7 is made of several longitudinal initial layers pushed closely together to form a suitable rectangular shape, wherein the adjacent briquettes 1 of the individual longitudinal rows are aligned into transverse rows Q. In the example shown the initial stacking layer 7 is composed of three longitudinal rows L1, L2 and L3 and of seven transverse rows Q1, Q2, ... Q7.

The carrier 10 is moved in the direction of the arrow A to a position in which a selected part or all the initial longitudinal rows belonging to the stacking layer 7 may be lifted from the fixed support upon very slight lowering thereof so that the upper edges of the strips 8 project to a very small extent above the top level of the rollers 6. In the embodiment shown, the entire stacking layer 7 is preferably raised, but depending on requirements a correspondingly smaller number of transverse rows could also be engaged from below by the strip table 10.

Meanwhile the stop 12 is moved far enough towards the stacking layer in the direction of arrow A until deposition of the first transverse row Q1 of briquettes is determined and the stop 12 then is immobilized in this position. The initial stacking layer 7 is moved by means of the carrier 10 towards its front end (in the direction of transverse row Q7) until the leading briquettes, in this case the leading transverse row Q7, come to rest against the stop 12. Since the strip table 10 is continuously advanced in the direction or arrow B, and the stop 12 is not moving at this time, the relative movement of the carrier 10 and the stop 12 causes the rearmost transverse rwo Q1 of briquettes to be discharged from the carrier onto the setting table 5.

Since in this example a gap S1 is to be formed between the transverse rows of briquettes Q1 and Q2, the stop 12 is caused to move conjointly with the carrier 10 in the direction of arrow B for a distance corresponding to the length of the gap S1, whereupon movement of the stop 12 ceases. During the further advance of carrier 10 in the direction of arrow B, movement of the briquettes is interrupted by the stop 12 and the transverse row of briquettes Q2 (which now forms the rearmost transverse row) is discharged from the carrier onto the setting table 5.

As soon as the transverse row of briquettes Q2 is on the setting table 5, the stop 12 is again set in motion in the direction of arrow B, in synchronism with the strip table 10, so that it can be set to its next transfer position, which then determines the next gap S2 to be formed between the transverse rows of briquettes Q2 and Q3.

The required gaps can be produced in similar manner between all the other transverse rows of briquettes. However, for the finished stacking layer a placing plan is desired in this embodiment wherein the three transverse rows of briquettes Q3, Q4, and Q5 are to be laid closely against each other; these three rows must therefore be transferred in sequence onto the setting table 5, without the stop being moved in the direction of arrow B.

Figure 3:
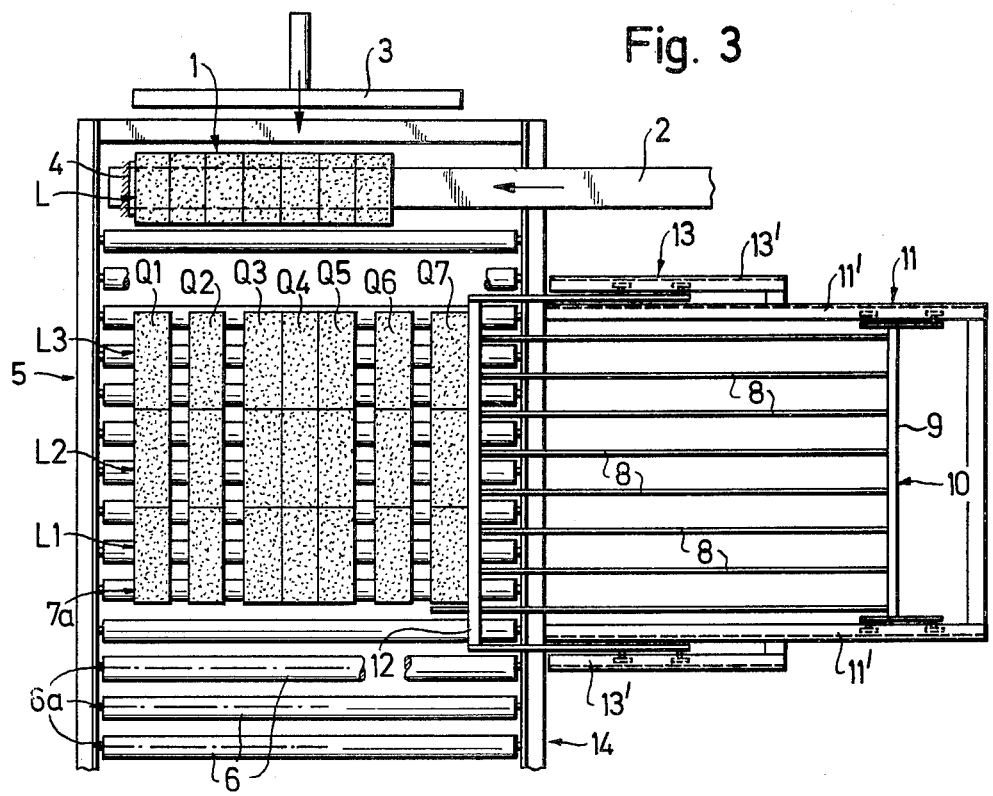
FIG. 3 is a further plan view of the device, similar to FIG. 1, but at a different stage of the method.
Figure 4:
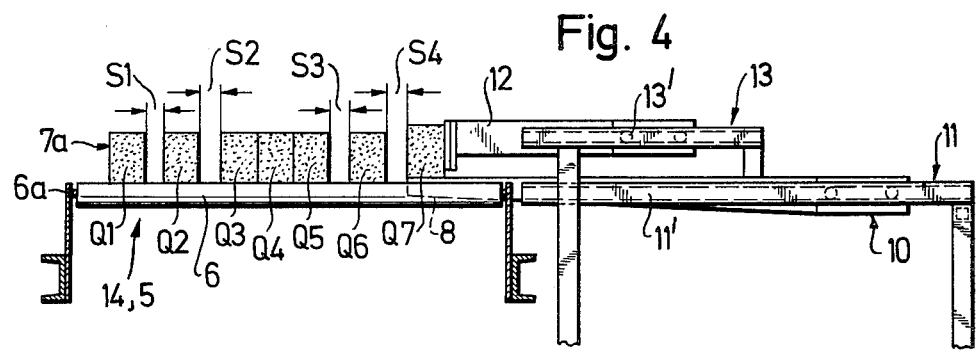
FIGS. 4 and 5 are two sectional views similar to FIG. 2, but at various stages of the method (during the separation).

As may be seen from FIGS. 3 and 4 the further separation of the transverse rows of briquettes is effected by forming gaps S3, S4 respectively between the transverse rows Q5 and Q6 and between Q6 and Q7, and this takes place in the manner described above. The final setting of stacking layer 7a can be clearly seen from FIG. 3. This final stacking layer 7a can then be engaged for instance by a setting gripper (not shown) and deposited on a furnace trolley or other suitable support. If a number of final stacking layers 7a are to be engaged simultaneously by the setting gripper, the roller track or setting table 5 can have a suitably widened portion in the form of an assembly track 14 (see FIGS. 1 and 3) into whose area the prepared stacking layer 7a is taken.

Figure 5:
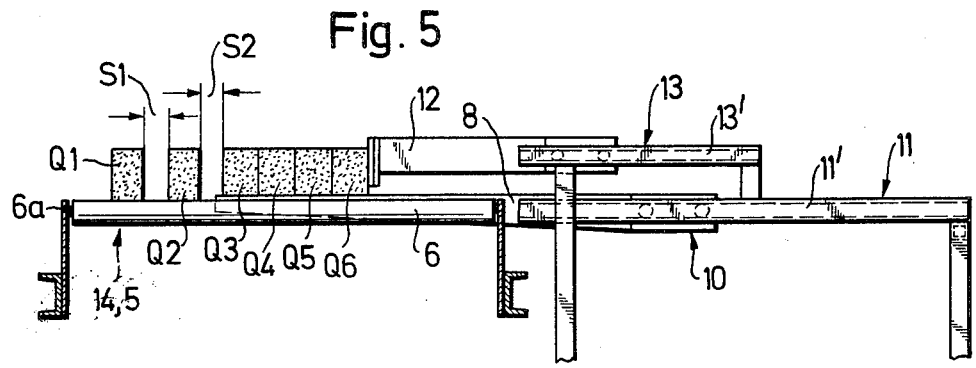

If different stacking layers 7a (e.g. with a square or rectangular layout) are to be formed on the setting table 5, a different number of briquettes 1 is supplied by the conveyor belt 2. While in the example in FIGS. 1–4 each stacking layer consists of three longitudinal rows of briquettes L1, L2 and L3, and of seven transverse rows of briquettes Q1 ... Q7, so that each longitudinal rows contains seven briquettes 1, both the number of longitudinal rows and the number of transverse rows of briquettes can be varied according to need. FIG. 5 shows a longitudinal row L of briquettes or a stacking layer which is composed of only six briquettes or six transverse rows Q1 ... Q6.

A very great number of variations of stacking layers can be produced in highly simple manner by the method of the invention without the apparatus used for applying the method requiring any expensive conversions; suitable readjustment of stop 12 and of its stop control means is sufficient. Also if the format of the briquettes 1 is to be changed, a relatively simple and quick reprogramming of the stop 12 is sufficient to provide the desired stacking layer.

While the formation of complete stacking layers has been described with reference to FIGS. 1–5, the method in accordance with the invention obviously when necessary permits only a single longitudinal row of articles or briquettes to be formed, which in this row are spaced individually or in groups at predetermined gaps.

As stated initially, the required longitudinal rows can be formed of different articles. Instead of ceramic briquettes, any type of packet or the like could be assembled into a stacking layer in the way described, and then superimposed into a stack, for instance on a pallet or the like.

In any case an extremely effective grouping of the articles can be achieved, with both the articles themselves and the corresponding part of the apparatus provided by the invention very protectively handled. The apparatus used for carrying out the method is also of very compact construction and takes up relatively small space.

What is claimed is:

1. A method of forming at least one row of articles wherein selected articles are selectively spaced from one another, said method comprising assembling said articles on a support and closely adjacent one another in at least one row; lifting a selected number of said articles off said support and onto a movable carrier; conjointly moving said carrier and the articles carried thereby at the same speed and in the direction of one end of said row; and periodically interrupting the movement of articles carried by said carrier for selected time periods while continuing the movement of said carrier, whereby a selected number of articles periodically are discharged from said carrier in a row, the number of articles discharged from said carrier during any one period of interruption of movement of the articles carried by said carrier being dependent on the duration of such interruption, and the spacing between articles successively discharged from said carrier being dependent on the time between successive interruptions.

2. A method according to claim 1 wherein a quantity of said articles are assembled on said support in a plurality of adjacent, parallel rows.

3. A method according to claim 2 wherein selected articles in all of said rows are lifted off said support onto said carrier.

4. A method according to claim 1 wherein the movement of said carrier is uniform during each period of interruption.

5. A method according to claim 1 wherein the movement of said carrier is variable in each period of interruption.

6. Apparatus for forming at least one row of articles wherein selected articles are selectively spaced from one another, said apparatus comprising a support; means for assembling a plurality of articles on said support closely adjacent one another in a longitudinally extending row; carrier means for lifting a selected number of said articles off said support; means mounting said carrier means and the articles carried thereby for movement along a path extending in a direction longitudinally of said row; stop means occupying a position in the path of movement of the articles carried by said carrier means; and means mounting said stop means for conjoint movement with and at the same speed of said carrier means in said direction and for movement relative to said carrier means for selected periods of time in the opposite direction for interrupting movement of the articles carried by said carrier means, the interruption of movement of articles carried by said carrier means effecting discharge of a selected number of said articles from said carrier means in a row and the time intervals between successive periods of such interruption establishing a selected spacing between successive articles discharged from said carrier means.

7. Apparatus according to claim 6 wherein said carrier means comprises a frame supporting a plurality of spaced apart tine-like members.

8. Apparatus according to claim 6 wherein said support comprises a plurality of spaced apart roller members journaled at their opposite ends in tracks.

9. Apparatus according to claim 8 wherein said carrier means comprises a frame supporting a plurality of spaced apart, tine-like members, said tine-like members being alternately spaced with said roller members.

10. Apparatus according to claim 6 wherein said support is of such width as to accommodate a plurality of rows of said articles thereon.

11. Apparatus according to claim 10 wherein said carrier means is of such width as to accommodate said plurality of rows of articles thereon.

12. Apparatus according to claim 6 wherein the carrier means mounting means comprises parallel, spaced apart rails and wheels carried by said carrier means in engagement with said rails.

13. Apparatus according to claim 6 wherein said stop means comprises a bar-like member overlying said carrier means and extending transversely of the path of movement thereof.

14. Apparatus according to claim 13 wherein the stop means mounting means comprises frame members supporting said bar-like member at opposite ends of the latter and spaced apart rails for supporting said frame members.

15. Apparatus according to claim 14 including wheels carried by said frame members and engaging said rails.

* * * * *